May 13, 1958 G. A. BINDER 2,834,924
HERMETICALLY SEALED ELECTROMAGNETIC RELAY
Filed Jan. 31, 1957
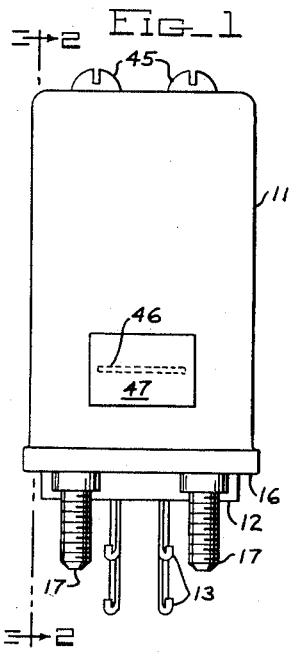
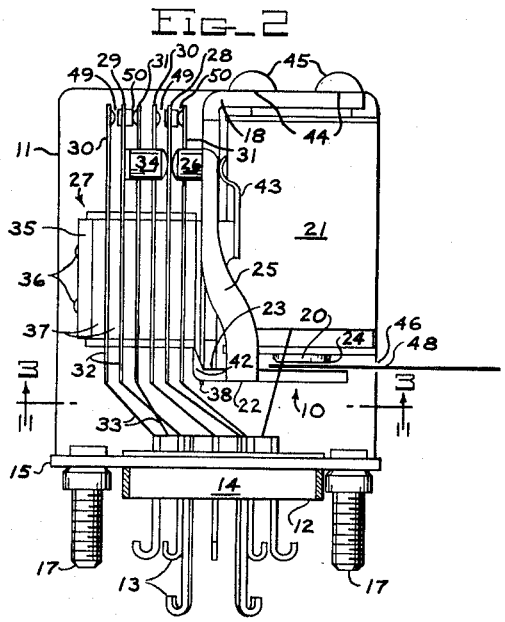
INVENTOR
GEORGE A. BINDER
BY
ATTORNEY

United States Patent Office 2,834,924
Patented May 13, 1958

2,834,924

HERMETICALLY SEALED ELECTROMAGNETIC RELAY

George A. Binder, Logansport, Ind., assignor to Essex Wire Corporation

Application January 31, 1957, Serial No. 637,441

3 Claims. (Cl. 317—165)

This invention relates to electromagnetic relays, and in particular to such relays of the hermetically sealed type.

Electromagnetic relays are frequently used under extreme conditions of temperature, humidity, and barometric pressure. To obtain reliable operation under such conditions, relays are commonly enclosed in metal hermetically sealed enclosures with electrical connections brought to the outside through a terminal header assembly. This construction has proven very effective in insuring a long effective life for the operation of relays under various atmospheric and ambient conditions.

In addition, these relays are frequently used in applications where they are subjected to shock and vibration. In such cases, malfunctioning of the relay may occur due to the temporary opening of closed contacts in the energized position of the relay. An important consideration in avoiding such malfunction is to have the relay adjusted with the optimum value of contact follow which is the distance two contacts travel together after just touching as the armature moves from the deenergized position to the energized position.

Proper adjustment of the contact follow also has an important bearing on the contact life and contact resistance. In normal operation of the relay, contact wear and arcing results in the loss of contact material. If the contact follow is initially less than the optimum value, the worn contacts may not close or may have an excessively high contact resistance.

In hermetically sealed relays, the contact follow adjustment must necessarily be made before the relay is completely enclosed. Occasionally the contact follow adjustment will be disturbed during the enclosure of the relay but such misadjustment cannot be detected after the relay is completely enclosed.

The general object of this invention is to provide an improved relay construction facilitating the testing of relays after they have been enclosed in a housing.

The specific object of this invention is to provide an improved construction for hermetically sealed electromagnetic relay units which permits the testing of the relay contact follow after enclosure of the relay.

Details of these objects and of the invention, as well as other objects thereof are set forth in the following specification and illustrated in the accompanying drawing forming a part thereof.

In the drawing:

Figure 1 is a side elevation of a hermetically sealed relay unit embodying the principles of the present invention.

Figure 2 is a longitudinal sectional view taken on the line 2—2 of Figure 1 showing a thickness gauge inserted into the relay unit.

Figure 3 is a cross-sectional view taken on the line 3—3 of Figure 2.

Figure 4 is a plan view on a smaller scale showing the opening in the housing of Figure 1.

Figure 5 is a plan view on the same scale as Figure 4 showing the plate covering the opening in Figure 1.

Figure 6 is a plan view on the same scale as Figure 4 showing the thickness gauge of Figures 2 and 3.

Referring to the drawing, there is illustrated a telephone type relay 10 enclosed in a metal housing 11 having a terminal header assembly 12 with spaced terminals 13 to provide for external electrical connections to the relay. The terminals 13 pass through an insulating disc 14 which is secured to the plate 15. The edge 16 of the housing 11 is crimped over to retain the plate 15 which is sealed to the housing with solder. Attached to the plate 15 are the studs 17 which are used for mounting purposes.

The relay comprises a substantially L-shaped frame 18, a magnetic core 20 secured to the frame 18 and carrying a coil 21, and a movable magnetic armature pivotably mounted on the lower end 23 of the frame 18 and co-operating with the pole face 24 at the lower end of the core 20. The armature 22 is provided with a pair of spaced apart and longitudinally extending arms one of which can be seen at 25. Each arm 25 carries an insulator 26 for switching engagement with the spring pile-up assemblies 27.

Each of the spring pile up assemblies 27 comprises movable or operating springs 28 and 29, the stationary make springs 30, and the stationary break springs 31. These springs carry normally open make contacts 49 and normally closed break contacts 50 at one end and terminate at the other end in soldering terminals 32 which are connected by lead wires 33 to the header terminals. The operating springs 29, in addition, carry an insulating member 34 which engages the operating springs 28 on the opposite side thereof from the insulating member 26 on the armature arm 25. The contact springs are held in a pile up assembly between the clamping plate 35 and the frame 18 by screws 36, the springs being insulated from each other by the insulators 37.

Interposed between the spring pile up assemblies 27 and the frame 18 are an armature retaining plate 38 and an armature stop member 39. The retaining plate 38 has an opening 40 into which the armature extension 41 projects which together with the armature hooks 42 hold the armature 22 in bearing engagement with the edge 23 of the frame. The armature stop member 39 has two adjustable arms 43 extending substantially parallel with the armature arms 25 to limit the extent to which the armature 22 may pivot on the frame edge 23 away from the core 20 under the influence of operating springs 28 and 29 in the normally deenergized position.

When the coil 21 is energized, the armature 22 is attracted to the core 20 of the relay causing the armature arms 25 to move toward the operating spring 28. The insulator 26 engages the spring 28 which transfers the movement of the armature arm 25 through the second insulator 34 to the operating spring 29. The stationary springs 30 and 31 are set over to permit the free movement of the insulators 26 and 34.

The rectangularly-shaped housing 11 for enclosing the relay is provided at its top with two openings 44 through which screws 45 pass to secure the relay frame 18 to the housing 11. One side of the housing 11 is also provided with a rectangularly-shaped opening 46 which is covered by a plate 47 welded and sealed to the housing 11 with solder after assembly of the relay 10 in the housing 11. The rectangular opening 46 is aligned with the air gap between the armature 22 and core pole face 24 of the relay to allow insertion of a shim thickness gauge 48 between the armature 22 and the core 20 of the enclosed relay immediately before the housing is sealed. The opening 46 is only wide enough to allow the shim gauge 48 to pass between the core pole face 24 and the armature 22 but not to strike the frame 18.

The contact follow or distance through which the relay contacts 49 travel together from the time the contacts first make is observed by noting how far the armature 22 moves from the time the normally open contacts 49 first make until the armature motion ceases. After the relay 10 has been assembled, adjusted, and enclosed, the shim gauge 48 is inserted through the opening 46 between the armature 22 and the pole face 24 to determine if the normally open contacts 49 will make when the armature 22 is separated from the pole face 24 by a fixed distance equal to the thickness of the shim gauge 48. Visual indication of contact make is provided by connecting the relay to a test set having indicator lights for each contact circuit being tested. If the contact follow adjustment is found to be satisfactory, the plate 47 is welded over the opening 46 and the relay unit is then sealed in the usual manner.

While the invention has been illustrated in connection with a specific type of relay, it will be equally applicable to other types of relays and it is intended to cover all such types as fall within the spirit and scope of the appended claims.

I claim:

1. In a hermetically sealed relay, the combination with a magnetic relay structure including a fixed core member having an end portion defining a pole face and a movable armature separated in a normal deenergized position from said pole face by an air gap, and a terminal header assembly; of a housing forming a closure with said header assembly to enclose said relay, said housing including an opening therethrough aligned with respect to said air gap and having a transverse axis substantially coplanar with said pole face; said air gap being accessible through said opening to permit the temporary insertion of a thickness gauge through said opening into the air gap between the core and the armature for testing purposes; and a cover plate attached to said housing to seal said opening.

2. The structure defined in claim 1, wherein the size and shape of said opening relative to the size and shape of said gauge is such that said gauge may be inserted into said housing only far enough to barely pass over the pole face.

3. In a hermetically sealed relay, the combination with a magnetic relay structure including a fixed core member having an end portion defining a pole face and a movable armature separated in a normal deenergized position from said pole face by an air gap, and a terminal header assembly; of a metallic housing enclosing said relay and forming a closure therefor with said header assembly; said housing including a substantially rectangularly shaped opening aligned with respect to the air gap between said pole face and said armature and having a transverse axis substantially coplanar with said pole face; a metallic plate secured and sealed by solder to said housing to seal said opening; and said air gap being accessible through said opening such that before said plate is secured to said housing, a thickness gauge may be passed through sadi opening to check said air gap.

References Cited in the file of this patent

UNITED STATES PATENTS

| 2,303,218 | Musser | Nov. 24, 1942 |
| 2,458,247 | Bryan | Jan. 4, 1949 |
| 2,773,962 | Perst | Dec. 11, 1956 |